United States Patent [19]
Kawanishi et al.

[11] Patent Number: 5,488,468
[45] Date of Patent: Jan. 30, 1996

[54] OPTICAL DISTANCE MEASURING APPARATUS HAVING SEMICONDUCTOR POSITION SENSITIVE PHOTODETECTOR

[75] Inventors: Shinya Kawanishi, Tenri; Kouichi Furuta, Nara; Keiichi Okada, Yamatokouriyama, all of Japan

[73] Assignee: Sharp Kabushiki Kaisha, Japan

[21] Appl. No.: 994,970

[22] Filed: Dec. 22, 1992

[30] Foreign Application Priority Data

| Dec. 26, 1991 | [JP] | Japan | 3-344892 |
| Jan. 7, 1992 | [JP] | Japan | 4-000087 U |
| Mar. 24, 1992 | [JP] | Japan | 4-065754 |
| May 6, 1992 | [JP] | Japan | 4-113489 |

[51] Int. Cl.⁶ ................................................. G01C 3/08
[52] U.S. Cl. ........................... 356/4.01; 356/3.02; 384/14
[58] Field of Search ............................. 356/5, 4, 1, 3.02, 356/4.01; 385/14

[56] References Cited

U.S. PATENT DOCUMENTS

| 4,818,099 | 4/1989 | Preikschat et al. ................. 356/5 |
| 4,921,345 | 5/1990 | Tsuchitani et al. ................. 356/1 X |
| 4,989,934 | 2/1991 | Zavracky et al. ................. 350/96.11 |
| 5,005,970 | 4/1991 | Kunishige ................. 356/1 |
| 5,026,134 | 6/1991 | Sugawara et al. ................. 350/96.11 |
| 5,233,382 | 8/1993 | Taniguchi et al. ................. 356/1 X |

OTHER PUBLICATIONS

"Design and Fabrication of a Distance Sensor by PSD" Aug. 1990.
"Photodetectors for Auto–Focus Systems", National Technical Report vol. 29, No. 6, Dec. 1983.
"Photo Electrical Switch of Distance Measuring System of MR3" No. 38 Jun. 1989.

*Primary Examiner*—Mark Hellner
*Attorney, Agent, or Firm*—Nixon & Vanderhye

[57] ABSTRACT

A light emitting element and a light receiving element are installed on a wiring board mounted in a housing case. Light emitted from the light emitting element is irradiated on an object to be detected through a first lens installed in the housing case. Light reflected by the object to be detected is received by the light receiving element through a second lens installed in the housing case. The housing case is formed of a grounded conductive material, and the wiring board is formed of a material having a coefficient of linear expansion equivalent to that of the housing case.

20 Claims, 18 Drawing Sheets

FIG. 11 (A) PRIOR ART
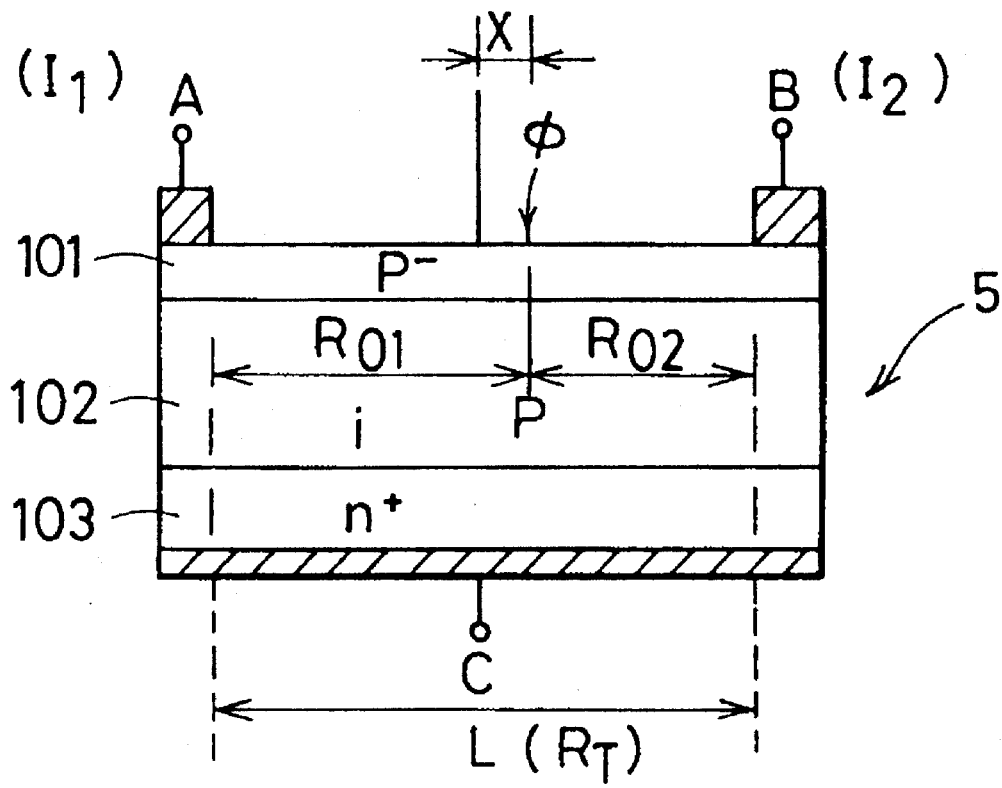
FIG. 11 (B) PRIOR ART
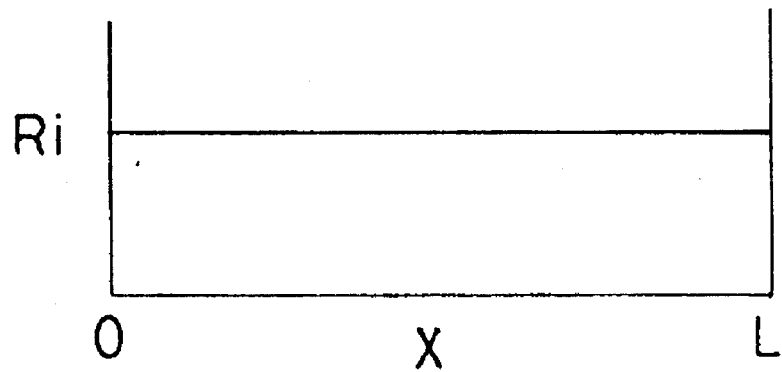

FIG. 17 (A) PRIOR ART
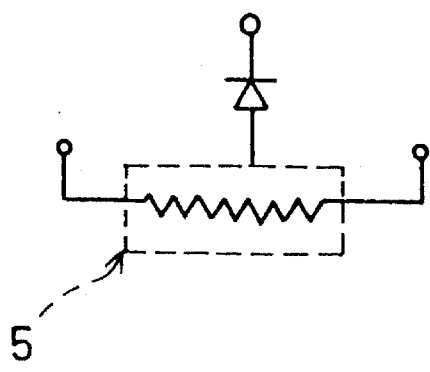
5
FIG. 17 (B) PRIOR ART
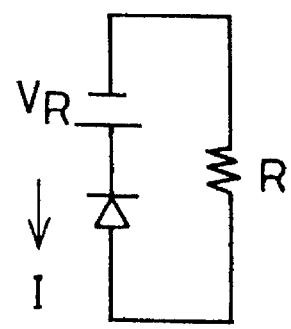

OPTICAL DISTANCE MEASURING APPARATUS HAVING SEMICONDUCTOR POSITION SENSITIVE PHOTODETECTOR

BACKGROUND OF THE INVENTION

1. Field of the Invention

The present invention relates to distance measuring apparatuses, and more particularly, to a distance measuring apparatus such as a distance measuring sensor using a semiconductor position sensitive photodetector (hereinafter referred to as a PSD).

2. Description of the Background Art

The PSD as a light receiving element is a sensor to which a photodiode (PD) is applied for detecting a light spot position.

The operational principle of the PSD will now be described with reference to FIG. 11. A PSD 5 is formed of a silicon chip constituted of three layers of a p⁻ layer 101 at the surface, an n⁺ layer 103 at the rear face, and an i layer 102 therebetween. When a light spot $\phi$ is irradiated onto the surface of the PSD 5, generated electrical charges (carriers) are divided in a resistance layer (p⁻ layer) in reverse proportion to distances between the light incident position and electrodes A, B for output, and taken out from respective electrodes A, B as currents $I_1$, $I_2$.

As shown in FIG. 11 (A), assuming that the distance from the middle point of the electrodes A and B to a light incident position point P is x, a resistance value from the incident position point P to the electrode A is $R_{01}$, a resistance value from the incident position point P to the electrode B is $R_{02}$, the distance between the electrodes A and B is L, a resistance value between the electrodes A and B is $R_T$, and currents taken out from the electrodes A, B are $I_1$ and $I_2$, respectively, the currents $I_1$, $I_2$ are given as follows:

$$I_1 = \frac{R_{02}}{R_T} I_0 \quad (1)$$

$$I_2 = \frac{R_{01}}{R_T} I_0 \quad (2)$$

A photoelectric current $I_0$ is given as follows:

$$I_0 = I_1 + I_2 \quad (3)$$

Since distribution of resistivity $R_t$ of the surface resistance layer (p⁻ layer) is uniform as shown in FIG. 11 (B), the resistances $R_{01}$, $R_{02}$ are proportional to the distances from the incident position point P to the electrodes A, B, and given as follows:

$$R_{01} = \frac{R_T}{2}\left(1 + \frac{2}{L}x\right) \quad (4)$$

$$R_{02} = \frac{R_T}{2}\left(1 - \frac{2}{L}x\right) \quad (5)$$

Substitution of the above equations for equations (1) and (2) gives the following equations of the currents $I_1$, taken out from the electrodes A, B:

$$I_1 = \frac{\frac{R_T}{2}\left(1 - \frac{2}{L}x\right)}{R_T} I_0 \quad (6)$$

$$I_2 = \frac{\frac{R_T}{2}\left(1 + \frac{2}{L}x\right)}{R_T} I_0 \quad (7)$$

Taking the ratio of the sum and the difference of the currents $I_1$, $I_2$, the following equation is given:

$$\frac{I_2 - I_1}{I_1 + I_2} = \frac{2x}{L} \quad (8)$$

In this way, when the PSD is used as a light receiving element, direct positional information x can be obtained as an output.

As described above, in the PSD, the balance of pulled-out signal currents $I_1$ and $I_2$ changes depending on positions of incident light spots. FIG. 12 shows the detection principle of the distance measuring sensor using the PSD.

As shown in FIG. 12, light emitted from an infrared light emitting diode (LED) mounted on a print wiring board (PWB) 22 passes through a lens 2 mounted on the front face of a housing case 21 to be reflected by an object 3 (a man as an example) to be detected to be incident on the PSD 5 mounted on the PWB 22 through a lens 4. The position (the light spot position) where the reflected light M is incident on the PSD 5 changes depending on a distance D between the man 3 and the sensor. If the object 3 to be detected becomes remote (if the D becomes larger), light is reflected by the object 3 as shown by a dashed line M1 of FIG. 12, causing the spot position of the light incident on the PSD 5 also to change. When the spot position of light incident on the PSD 5 changes, the balance of the signal currents $I_1$ and $I_2$ taken out from both ends of the PSD 5 changes accordingly.

By detecting the balance of the signal currents $I_1$ and $I_2$ in a signal processing circuit (not shown) formed on the PWB 22, it is possible to detect the distance between the object 3 to be detected and the sensor, making it possible to use the PSD 5 as a distance measuring sensor.

FIG. 13 shows a function block of a conventional distance measuring sensor using the PSD. Referring to FIG. 13, a signal processing circuit 8 processes a signal current obtained from the PSD 5, and a LED driving circuit portion drives a LED 1.

FIG. 14 shows an example of the signal processing circuit 8 for processing the signal currents $I_1$ and $I_2$ of the PSD 5. Referring to FIG. 14, R1 to R7 show resistances, and $P_1$ to $P_5$ show amplifiers. The signal currents $I_1$ and $I_2$ of the PSD 5 are converted to voltages $V_{01}$ and $V_{02}$, respectively, in a current/voltage converting circuit 11. In other words, $V_{01} = R_1 \times I_1$, and $V_{02} = R_1 \times I_2$ Subtraction of $V_{01}$ from $V_{02}$ is carried out in a subtracting circuit 12 to obtain an output voltage $V_{OA}$ corresponding to $I_2 - I_1$. $V_{OA}$ is given as follows:

$$V_{OA} = \frac{R_3}{R_2}(V_{02} - V_{01}) \quad (9)$$

$$= \frac{R_3}{R_2} \times R_1 \times (I_2 - I_1)$$

Addition of $V_{01}$ and $V_{02}$ is carried out in an adding circuit 13. In FIG. 14, $V_{03}$ is given as follows:

$$V_{03} = \frac{R_5}{R_4}(V_{01} + V_{02}) \quad (10)$$

$$= \frac{R_5}{R_4} \times R_1 \times (I_1 + I_2)$$

An output $V_{OB}$ corresponding to $(I_1 + I_2)$ can be obtained. $V_{OB}$ is given as follows:

$$V_{OB} = -\frac{R_7}{R_6} \times V_{03} \quad (11)$$

$$= \frac{R_7}{R_6} \times \frac{R_5}{R_4} \times R_1 \times (I_1 + I_2)$$

$$= \frac{R_3}{R_2} \times R_1 \times (I_1 + I_2)$$

where $$\frac{R_3}{R_2} = \frac{R_7}{R_6} \times \frac{R_5}{R_4}$$

By processing $V_{OA}$ and $V_{OB}$ in a microcomputer and the like, $V_{OA}/V_{OB}$ is calculated. $V_{OA}/V_{OB}$ is given as follows:

$$\frac{V_{0a}}{V_{OB}} = \frac{\frac{R_3}{R_2} \times R_1 \times (I_2 - I_1)}{\frac{R_3}{R_2} \times R_1 \times (I_1 + I_2)} = \frac{I_2 - I_1}{I_1 + I_2} \quad (12)$$

Therefore, as described above, since $(I_2-I_1)/(I_1+I_2)$ corresponds to the position of the light incident on the PSD 5, the spot position x of the light incident on the PSD can be found by the value of $V_{OA}/V_{OB}$, that is, $(I_2-I_1)/(I_1+I_2)$.

When the spot position of the light incident on the PSD 5 is found, the distance between the sensor and the object 3 to be detected can be found as shown in FIG. 12.

In this way, by processing the signal currents $I_1$ and $I_2$ of the PSD 5 in the signal processing circuit 8, it is possible to detect the distance between the sensor and the object 3 to be detected.

FIG. 15 shows an example of another signal processing circuit 8 of the PSD 5. The circuit of FIG. 15 is constituted of a logarithm converting circuit portion 15, and a differentially amplifying circuit portion 16. Outputs $V_{01}$ and $V_{02}$ of log diodes 17, 18 included in the logarithm converting circuit portion 15 are given as follows, where k is Boltzmann's constant, T is absolute temperature (°K.), and q is an amount of electrical charge of electrons:

$$V_{01} = V_{REF1} - \frac{kT}{q} \ln \frac{I_1}{I_0} \quad (13)$$

$$V_{02} = V_{REF1} - \frac{kT}{q} \ln \frac{I_2}{I_0}$$

An output $V_0$ provided from the differentially amplifying circuit portion 16 is given as follows:

$$V_0 = \frac{R_2}{R_1} (V_{02} - V_{01}) + V_{REF2} \quad (14)$$

$$= \frac{R_2}{R_1} \frac{kT}{q} \ln \frac{I_1}{I_2} + V_{REF2}$$

From the circuit, an output corresponding to log $(I_1/I_2)$ can be obtained. Since $I_1/I_2$ corresponds to the spot position x of the light incident on the PSD, the spot position of the light incident on the PSD can be found by the log $(I_1/I_2)$. When the spot position of the light incident on the PSD 5 can be found, as described before, it is possible to detect the distance between the sensor and the object 3 to be detected.

In a conventional distance measuring sensor, if there is a noise source of, for example, an inverter lamp and the like in the vicinity of the sensor, noise is generated in the signal currents $I_1$, $I_2$ of the PSD 5 and in the signal processing circuit 8 of the PSD 5, whereby accurate detection of the balance of the signal currents $I_1$ and $I_2$ of the PSD 5 is hampered, which, in turn, prevents accurate detection of the distance between the object 3 to be detected and the distance measuring sensor.

When the housing case 21 shown in FIG. 12 is fabricated of, for example, polycarbonate resin (a coefficient of linear expansion of which is 70 ppm/°C.), and the print wiring board 22 of the signal processing circuit 8 and the like is fabricated of glass epoxy copper-clad laminate (a coefficient of linear expansion of which is 13 ppm/°C.), if environmental temperature of the sensor changes, the relative positional relation between the light receiving lens 4 fixed to the housing case 21 and the PSD 5 fixed to the print wiring board 22 changes because of the difference of the coefficients of linear expansion. If the positional relation, the positional relation in the lateral direction (the up-to-down direction in the figure) in particular, between the light receiving lens 4 and the PSD 5 changes, even if the distance D between the object 3 to be detected and the distance measuring sensor does not change, the spot position of the light incident on the PSD 5 changes. As a result, the balance of the signal currents $I_1$ and $I_2$ of the PSD 5 changes, causing inaccurate detection of the distance measuring sensor.

FIG. 16 is a temperature characteristic diagram of the conventional distance measuring sensor. Distance characteristics between the sensor and the object 3 to be detected are measured at each of temperatures of −10° C., 7° C., 25° C., 39° C. and 60° C. selected as a predetermined temperature. From this diagram, it can be seen that a substantial output error is caused depending on environmental temperature.

In the above-described conventional technique, as shown in FIG. 13, since driving of the LED 1 is controlled only by a driving circuit portion 9, control of the amount of emitted light remained constant independently of the distance to the object to be measured. Therefore, for example, as shown in FIG. 12, when the PSD 5 is used, if it is intended to measure an object located at a long distance, it is necessary to increase the amount of received light.

However, if the amount of received light is increased, the generated photoelectric current exceeds an allowable photoelectric current of the PSD 5 in case of measurement of an object located at a short distance, resulting in a limit to the range of measurable distance.

Referring to FIG. 17, (A) shows an equivalent circuit of the PSD 5, while (B) shows an equivalent circuit in a reverse bias $V_R$. An allowable photoelectric current I in the circuit is given as follows:

$$I = \frac{V_R + V_{DF}}{R} \quad (15)$$

where $V_{DF}$ is a forward voltage of a diode.

Since the apparatus of the conventional technique includes only one set of the PSD 5 and the signal processing circuit 8, for example when the PSD 5 of a chip size shown by a solid line of FIG. 18 is used, light reflected by the object 3 to be detected passes through the lens 4 to be incident on the PSD 5 if the object 3 is between points A and B. In other words, the distance range between B and A is the range of measurable distance, and distance characteristics of the output of the PSD 5 become as shown by a solid line of FIG. 19.

In this conventional configuration, when it is desired to broaden the measurable range to from point C to A, the PSD 5 is made large as shown by a dashed line of FIG. 18. As a result, the distance between C and A becomes the distance measurable range, thereby making it possible to obtain distance characteristics of the output as shown by a dashed line of FIG. 19. However, as shown in FIG. 19, when the distance between the object 3 to be detected and the sensor is long, that is, the object 3 is in the vicinity of the point A, the gradient (an amount of the output change to the distance change) of the dashed line becomes smaller as compared to that (the amount of the output change to the distance change) of the solid line. In other words, a distance measuring error becomes larger in the characteristics shown by the dashed line than in those shown by the solid line, leading to poor accuracy of measurement.

As described above, the distance measurable range and the accuracy of measurement are characteristics conflicting with each other. In the conventional technique, there was a problem that the broader distance measurable range brought the poor accuracy of measurement and that the better accuracy of measurement brought the narrower distance measurable range.

The output current of the PSD of the distance measuring sensor is very slight. For example, when the distance D between the reflecting object 3 and the PSD 5 shown in FIG. 12 is 40 cm and 80 cm, the output currents of the PSD 5 are about $1 \times 10^{-8}$A and about $3 \times 10^{-9}$A, respectively.

Therefore, there was a problem that, if there is a noise source (for example, of an inverter fluorescent lamp and the like) in the vicinity of the distance measuring sensor, the distance measuring sensor is affected by the noise, making it impossible to obtain accurate distance information (distance measuring output).

FIG. 20 is a cross-sectional view showing the state where noise is incident on an IC chip containing a LED driving circuit, a PSD signal processing circuit and the like of the conventional distance measuring sensor.

As shown in FIG. 20, an IC 7 containing an IC chip 6 is mounted on the PWB 22. When there is a noise source in the vicinity of the IC chip 6, noises 29a, 29b as shown by arrows in the figure enter. As a result, the output current is affected by the noises, leading to inaccurate distance measurement.

SUMMARY OF THE INVENTION

One object of the present invention is to enhance reliability of measurement control in an optical distance measuring apparatus.

Another object of the present invention is to prevent influence of noise in the vicinity in an optical distance measuring apparatus.

Still another object of the present invention is to prevent influence of a change in environmental temperature in an optical distance measuring apparatus.

A further object of the present invention is to broaden the measuring range while maintaining accuracy of measurement in an optical distance measuring apparatus.

In order to achieve the above-described objects, the distance measuring apparatus according to one aspect of the present invention includes: a light emitting element; a lens; a light receiving element; and a signal processing circuit for detecting a signal current from the light receiving element, for irradiating light from the light emitting element onto an object to be detected, receiving the reflected light at the light receiving element through the lens, and measuring the distance between the apparatus and the object based on the signal current, characterized in that means is provided for preventing a change in the relative position of the lens and the light receiving element caused by a change in environmental temperature.

In the distance measuring apparatus constructed as described above, since the change in the relative position of the lens and the light receiving element caused by the change in environmental temperature is prevented, it is possible to prevent degradation of accuracy of measurement caused by the change in environmental temperature.

In order to achieve the above-described objects, the distance measuring apparatus according to the second aspect of the present invention includes: a light emitting element; a light receiving element; a wiring board having a signal processing circuit for detecting a signal current from the light receiving element formed thereon; and a housing case for accommodating at least the light receiving element, for irradiating light from the light emitting element onto an object to be detected, receiving the reflected light at the light receiving element, and measuring the distance between the apparatus and the object based on the signal current, characterized in that means is provided for shielding the housing case from noise.

In the distance measuring apparatus constituted as described above, since the light receiving element is shielded from noise, influence of noise can be prevented.

In order to achieve the above-described objects, the distance measuring apparatus according to the third aspect of the present invention includes a light emitting element for emitting light toward an object to be detected, a light receiving element for receiving light reflected by the object, a measuring apparatus for measuring the distance between the apparatus and the object based on a light receiving position in the light receiving element, a detecting apparatus for detecting an amount of received light in the light receiving element, and a control device for controlling an amount of emitted light of the light emitting element based on the detected amount of received light.

Since the distance measuring apparatus constituted as described above controls the amount of emitted light of the light emitting element based on the detected amount of received light, it is possible to broaden the measurable range while maintaining accuracy of measurement.

In order to achieve the above-described objects, the optical distance measuring apparatus according to the fourth aspect of the present invention for irradiating light onto an object to be detected for measuring the distance between the apparatus and the object based on a position where the reflected light is received includes: a light emitting element for emitting light toward the object to be detected; a first light receiving element having a first light receiving characteristic for receiving light reflected by the object; a second light receiving element having a second light receiving characteristic different from the first light receiving characteristic for receiving light reflected by the object; a measuring device for measuring the distance between the apparatus and the object based on the light receiving position of the first or the second light receiving element; a detecting device for detecting the amount of received light in the first light receiving element; and a control device for controlling the measuring device to measure the distance based on the light receiving position in the first light receiving element when the detected amount of received light is a reference value or less obtained from the first characteristic, and for controlling the measuring device to measure the distance based on the light receiving position in the second light receiving element when the detected amount of received light exceeds the reference value.

In the optical distance measuring apparatus constituted as described above, since the distance is measured based on the first or the second light receiving element in accordance with the detected amount of received light, it is possible to carry out measurement of a wide range while maintaining accuracy of measurement.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a diagram showing the operational principle of a conventional light receiving element and distribution of resistivity of a surface resistance layer of the light receiving element.

FIG. 17 is a diagram showing an equivalent circuit of the conventional light receiving element and an equivalent circuit of the light receiving element in a reverse bias.

DESCRIPTION OF THE PREFERRED EMBODIMENTS

Figure 1:
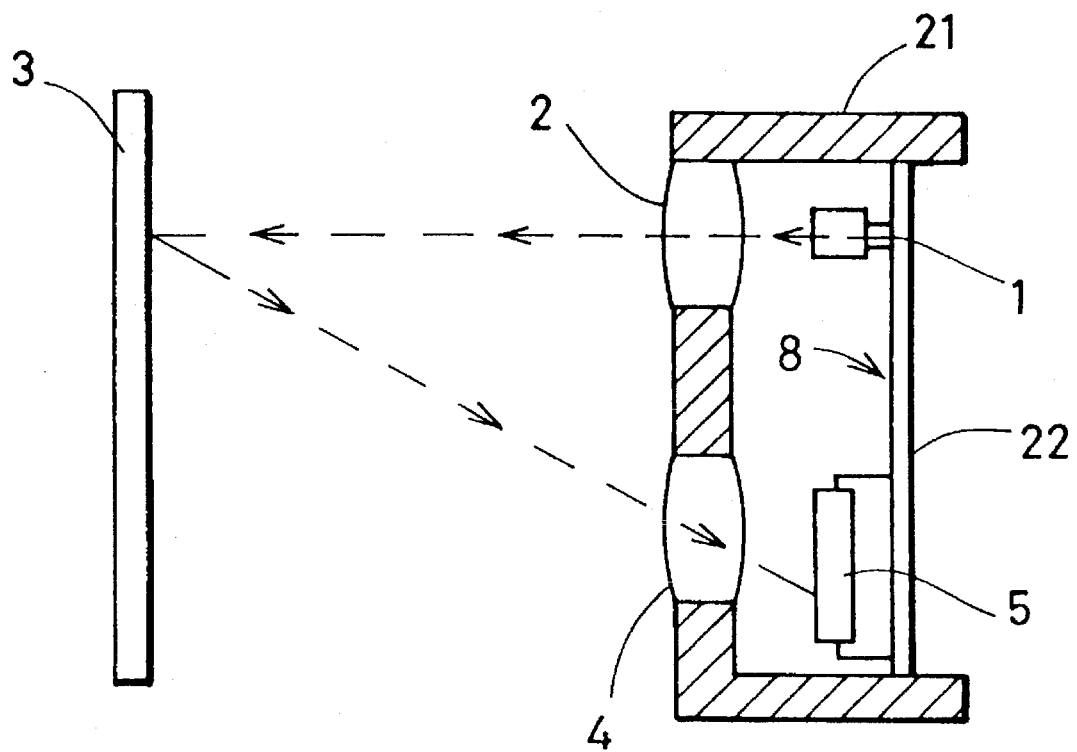
FIG. 1 is a diagram showing a cross-sectional structure of a distance measuring sensor according to a first embodiment of the present invention.

FIG. 1 is a cross-sectional view of the distance measuring sensor according to the first embodiment of the present invention.

Referring to FIG. 1, since components such as the light emitting element LED 1, the lenses 2, 4, the light receiving element PSD 5, the print wiring board (PWB) 22 having the driving circuit 9 of the LED 1, the signal processing circuit 8 of the PSD 5 and the like formed thereon have the same functions as those of a conventional type, description will not be repeated. The housing case 21 accommodates the wiring board 22 having said both elements 1, 5 mounted thereon which is to be positioned with respect to the lenses 2, 4.

In this embodiment, a material having conductivity and having a coefficient of linear expansion equivalent to that of said wiring board 22 is used as the housing case 21.

More specifically, for example, when glass epoxy copper-clad laminate of a coefficient of linear expansion 13 ppm/°C. is used as the wiring board 22, a plastic material of a coefficient of linear expansion 10–30 ppm/°C. is used as the housing case 21.

The housing case 21, containing carbon in order to have conductivity, is grounded to GND. As a result, since the distance measuring sensor produces a shield effect, improves the resistance to noise, and operates without being influenced by noise even if there is a noise source such as an inverter lamp in the vicinity, the distance between the object 3 to be detected and the distance measuring sensor can be detected accurately.

Figure 2:
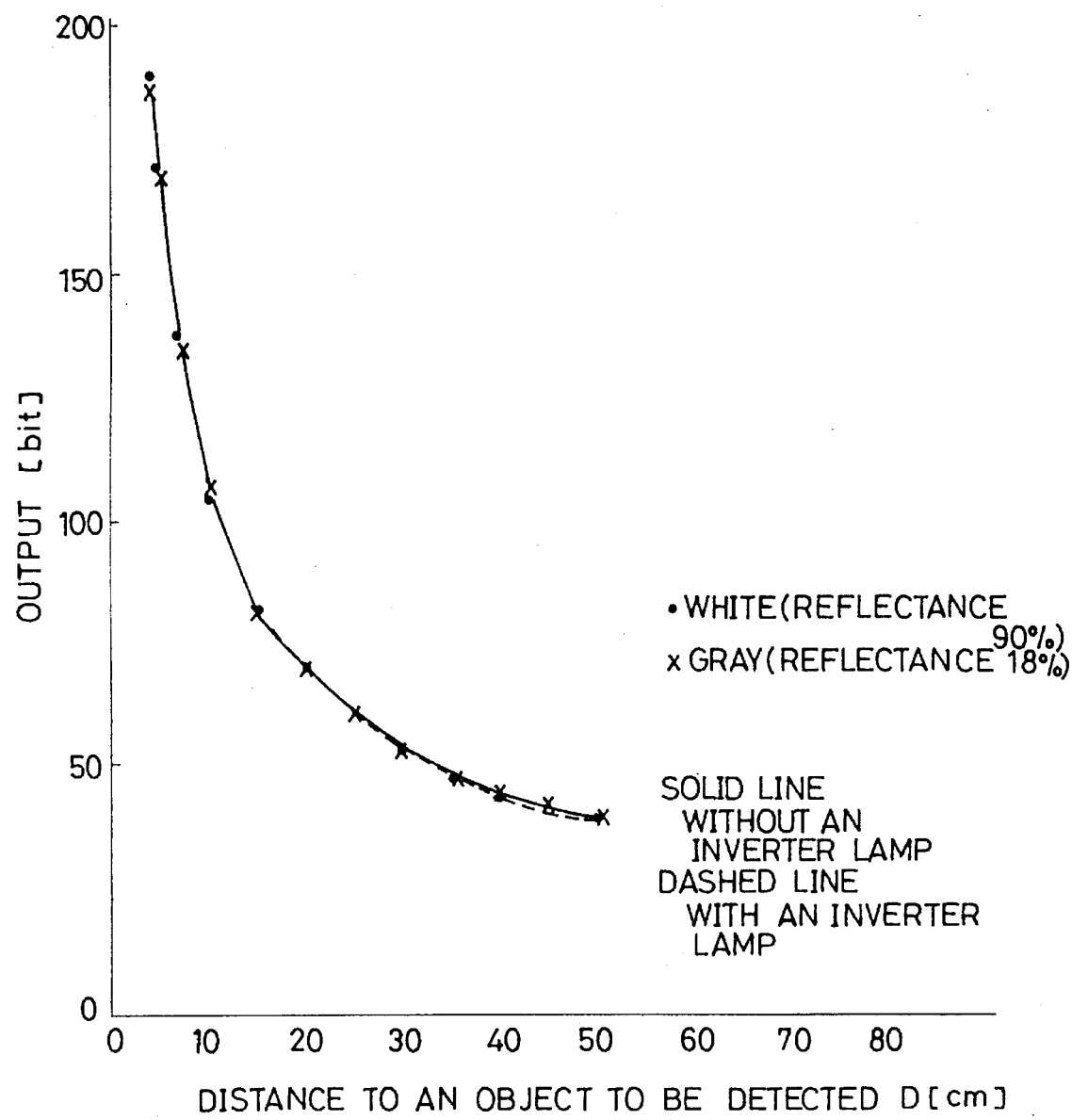
FIG. 2 is an output characteristic diagram in case where a housing case of the distance measuring sensor according to the first embodiment of the present invention is grounded.
Figure 3:
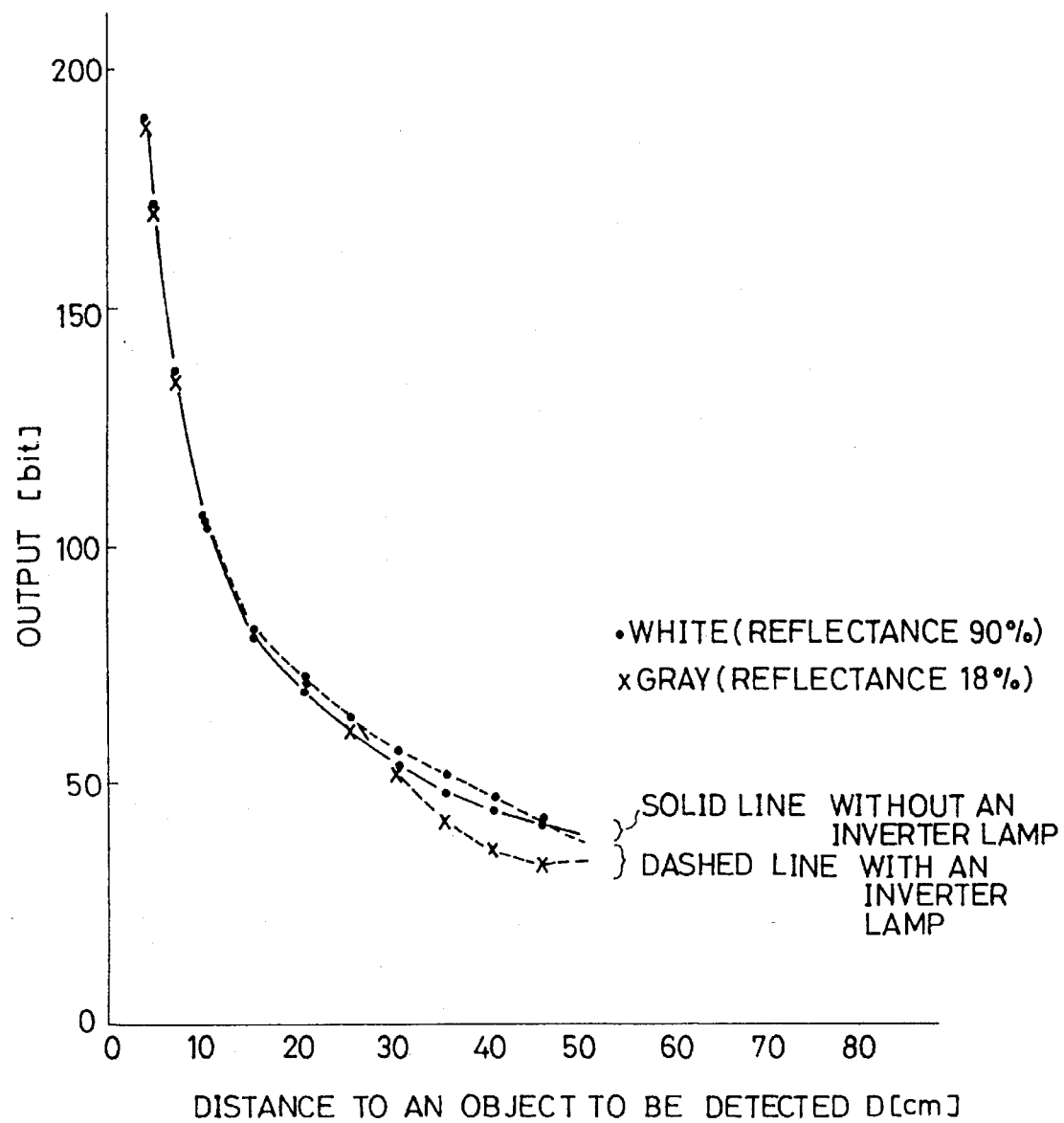
FIG. 3 is an output characteristic diagram in case where the housing case of the distance measuring sensor according to the first embodiment of the present invention is not grounded.

FIGS. 2 and 3 show output characteristic diagrams in case where the housing case 21 is grounded, and where the housing case 21 is not grounded, respectively. The distance measuring sensor used in the experiment has the detectable range of 4–30 cm, and a white object of reflectance of 90% and a gray object of reflectance 10% are used as the objects 3 to be detected. In the figures, solid lines and dashed lines show distance characteristics between the sensor and the objects 3 in case where there is no inverter lamp in the vicinity, and where the inverter lamp is positioned about 20 cm away, respectively. Comparison of FIG. 2 with FIG. 3 shows that the output error is smaller in the case where the housing case 21 is grounded.

Since the housing case 21 is fabricated of a material having a coefficient of linear expansion equivalent to that of the wiring board 22, when temperature changes, the light receiving lens 4 fixed to the case 21 and the PSD 5 fixed to the wiring board 22 change their positions equivalently, causing a little change in the relative position of the light receiving lens 4 and the PSD 5. Therefore, the spot position of the light incident on the PSD 5 changes little depending on temperature, whereby the output of the distance measuring sensor changes little in accordance with the temperature change.

Figure 4:
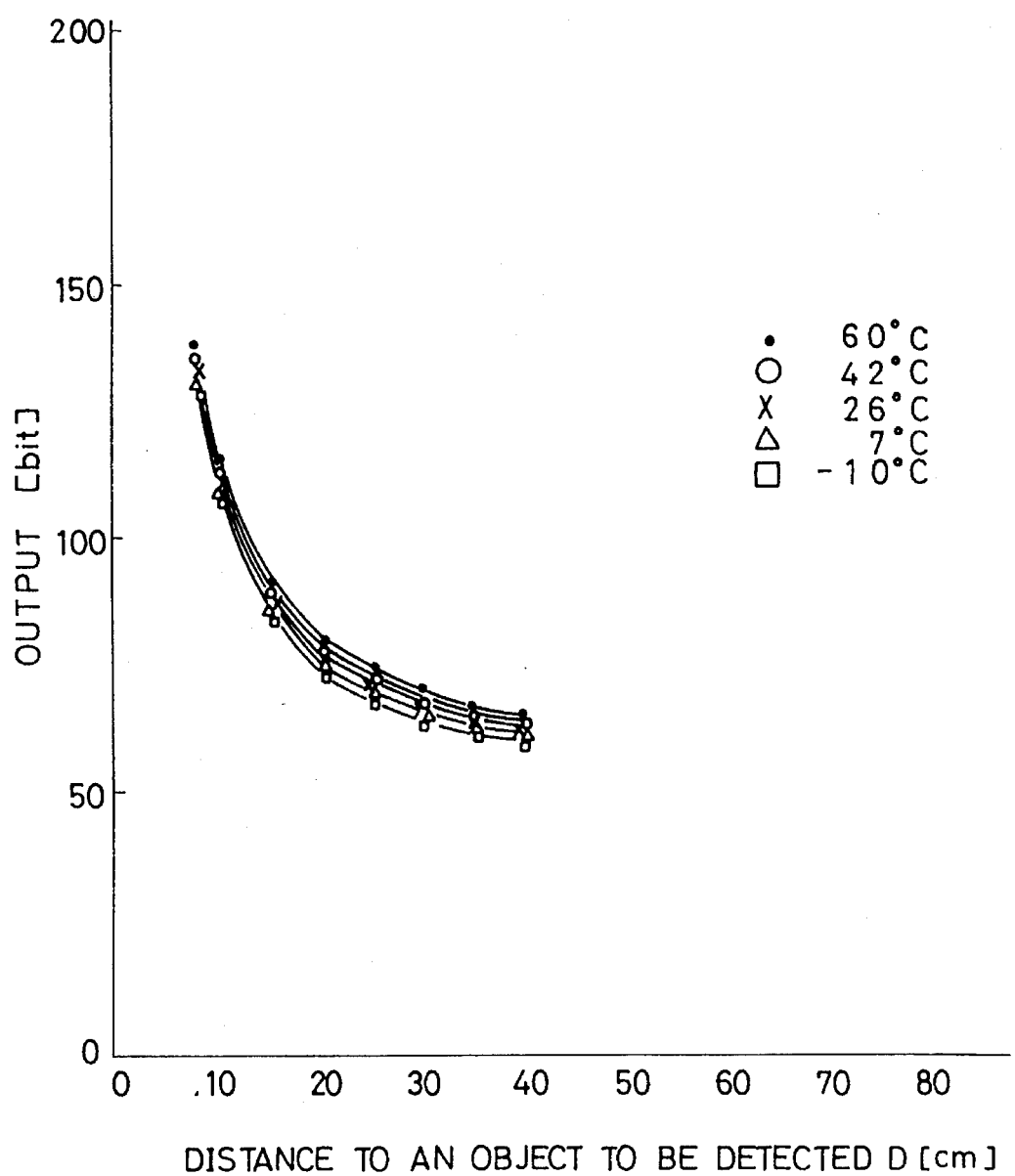
FIG. 4 is an output characteristic diagram in accordance with a change in temperature of the distance measuring sensor according to the first embodiment of the present invention.
Figure 16:
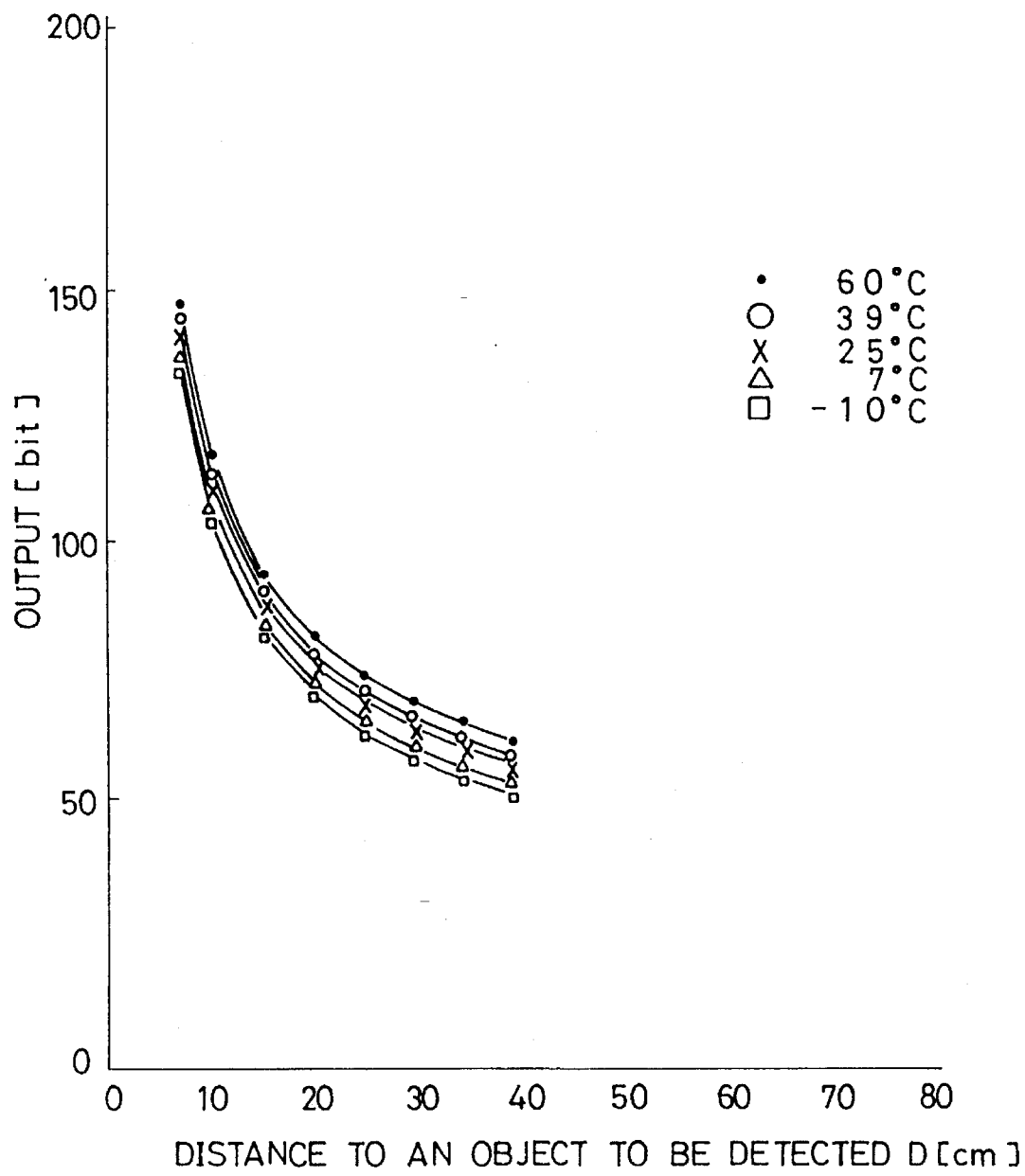
FIG. 16 is an output characteristic diagram depending on a temperature change of the conventional distance measuring sensor.
Figure 18:
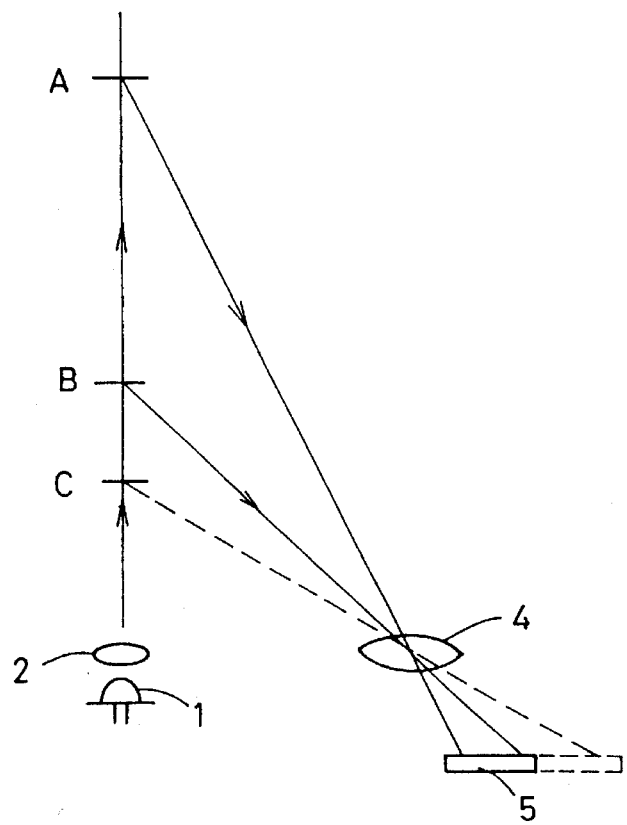
FIG. 18 is a diagram showing the positional relation between the light emitting element and the light receiving element of the conventional distance measuring sensor.
Figure 19:
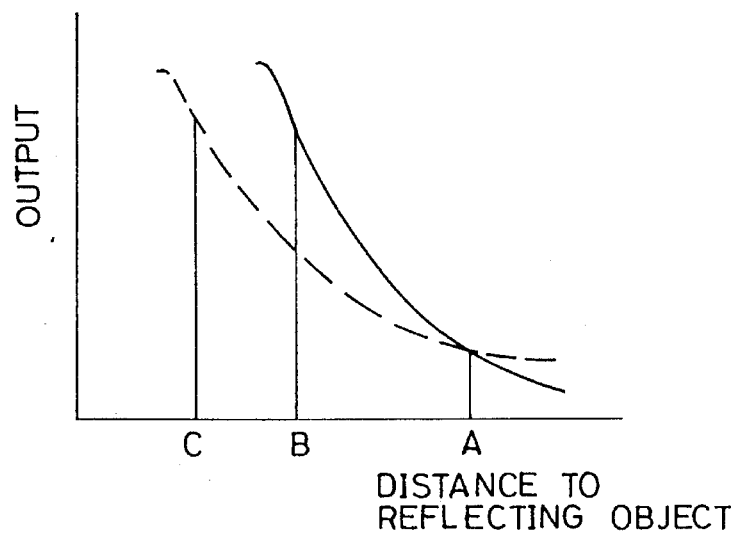
FIG. 19 is an output characteristic diagram of the light receiving element corresponding to FIG. 18.
Figure 20:
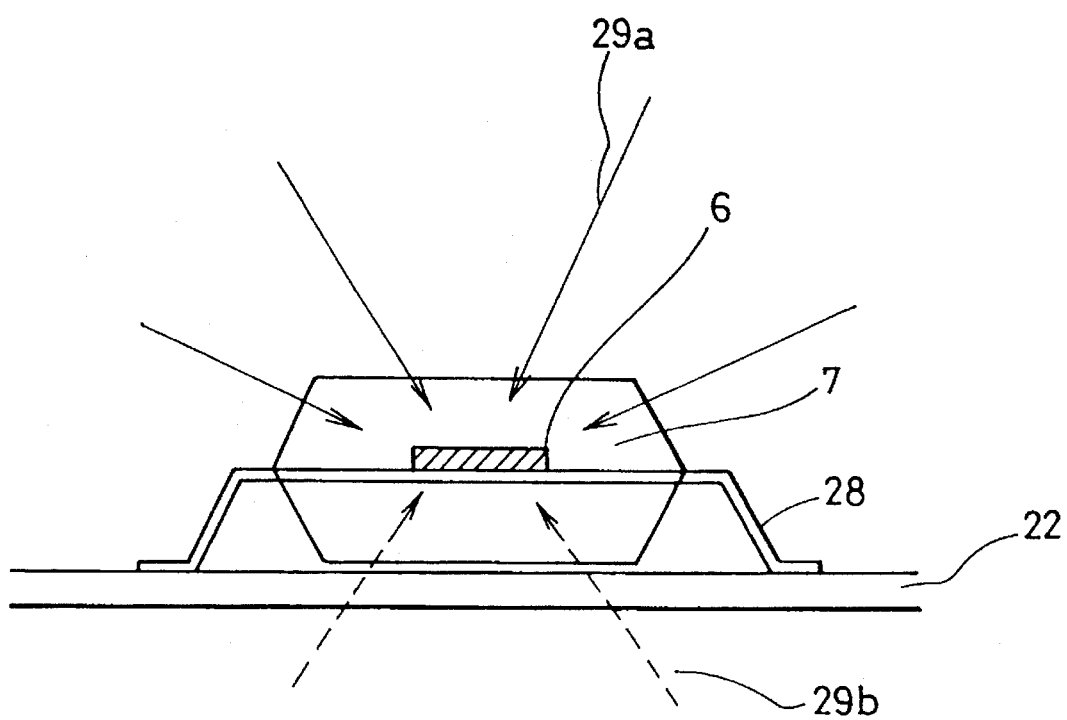
FIG. 20 is a diagram showing a cross-sectional structure of the IC used in the conventional distance measuring sensor.

FIG. 4 is a temperature characteristic diagram of the distance measuring sensor according to the first embodiment of the present invention. Compared to a conventional example of FIG. 16, it can be seen that the output error caused by environmental temperature is reduced.

As described above, it is possible to enhance resistance to noise and improve temperature characteristics by fabricating the housing case 21 of the distance measuring sensor of a material having conductivity and a coefficient of linear expansion equivalent to that of the wiring board 22.

According to the present invention, enhancement of resistance to noise and improvement of temperature characteristics can be obtained only by a change in materials for fabricating the case 21, making it unnecessary to change the manufacturing steps.

The present invention is not limited to the above-described embodiments, and it is apparent that various modifications and variations can be made to the above-described embodiments within the scope of the present invention.

For example, the same material as that of the print wiring board with a conductive material such as carbon mixed therein may be used as the housing case.

Figure 5:
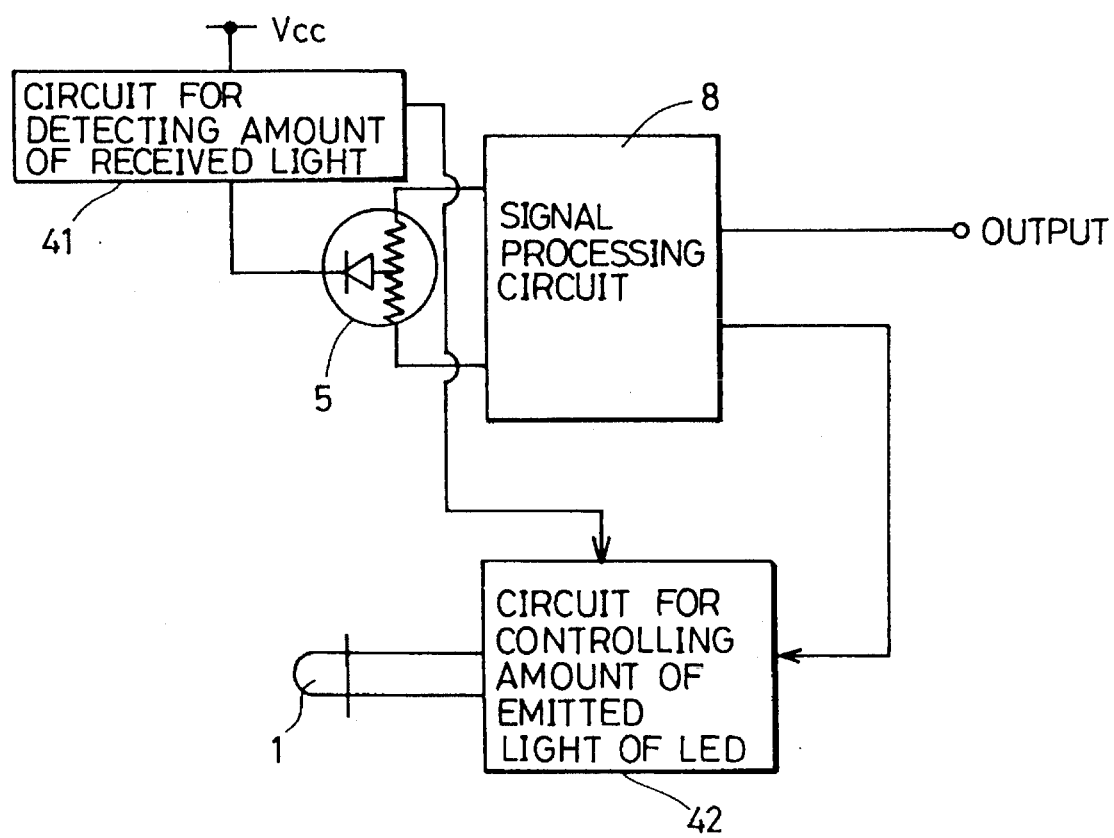
FIG. 5 is a system block diagram showing a configuration of the distance measuring sensor according to a second embodiment of the present invention.

A second embodiment of the present invention will now be described with reference to FIG. 5.

In the figure, since components such as the light emitting element LED 1, the light receiving portion PSD 5, the signal processing circuit 8 have the same functions as those of a conventional type, description will not be repeated.

In this embodiment, a detecting circuit 41 for detecting the amount of received light of the PSD 5 is provided. The detecting circuit 41 detects a photoelectric current flowing into the PSD 5.

A signal from the detecting circuit 41 is applied to a control circuit 42 for controlling the amount of light emitted from the LED 1. The control circuit 42 controls the amount of emitted light of the LED 1 not to exceed the acceptable photoelectric current of the PSD 5. In other words, when the light output current of the PSD 5 increases, the control circuit 42 controls the light output current not to exceed the acceptable photoelectric current of the PSD 5 by reducing the amount of emitted light of the LED 1.

In the above-described configuration, when it is intended to measure an object located at a long distance, the amount of emitted light is controlled to increase. In this case, since the amount of light received from the reflecting object is not so large, the produced current does not exceed the acceptable photoelectric current of the PSD 5.

When it is intended to measure an object located at a short distance, the produced current is controlled not to exceed the acceptable photoelectric current of the PSD 5 by reducing the amount of emitted light.

Figure 6:
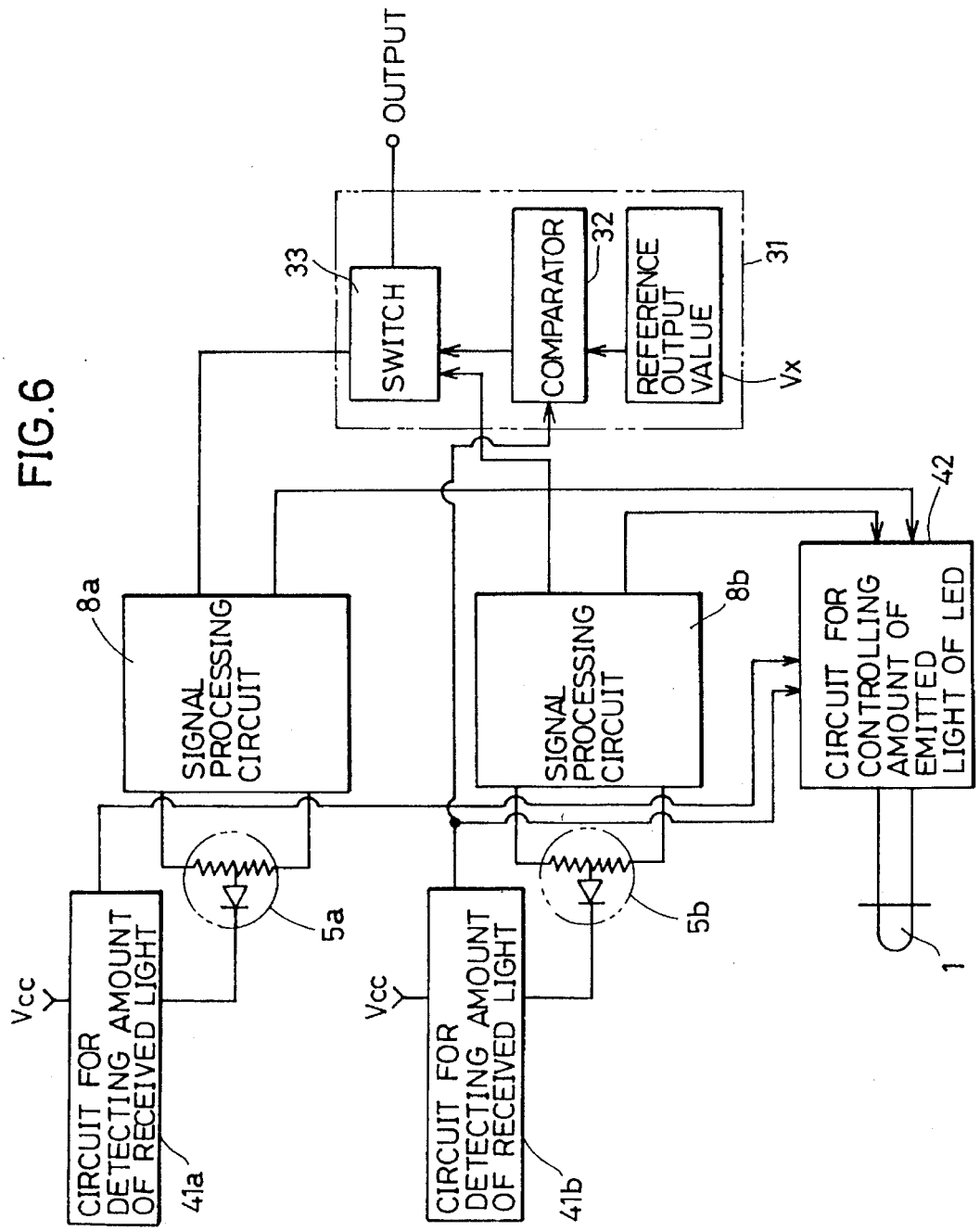
FIG. 6 is a system block diagram showing a configuration of the distance measuring sensor according to a third embodiment of the present invention.
Figure 7:
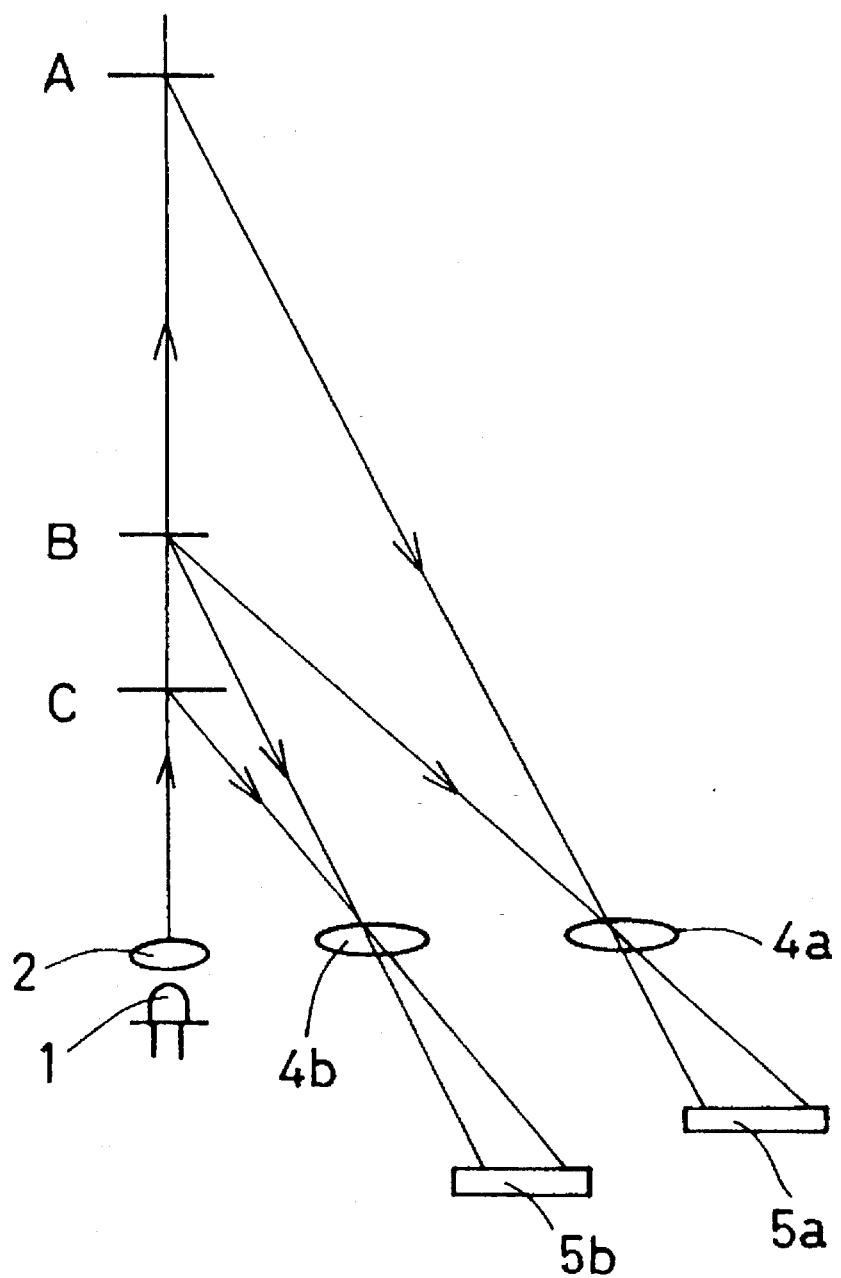
FIG. 7 is a diagram showing the positional relation between a light emitting element and a light receiving element according to the third embodiment of the present invention.
Figure 8:
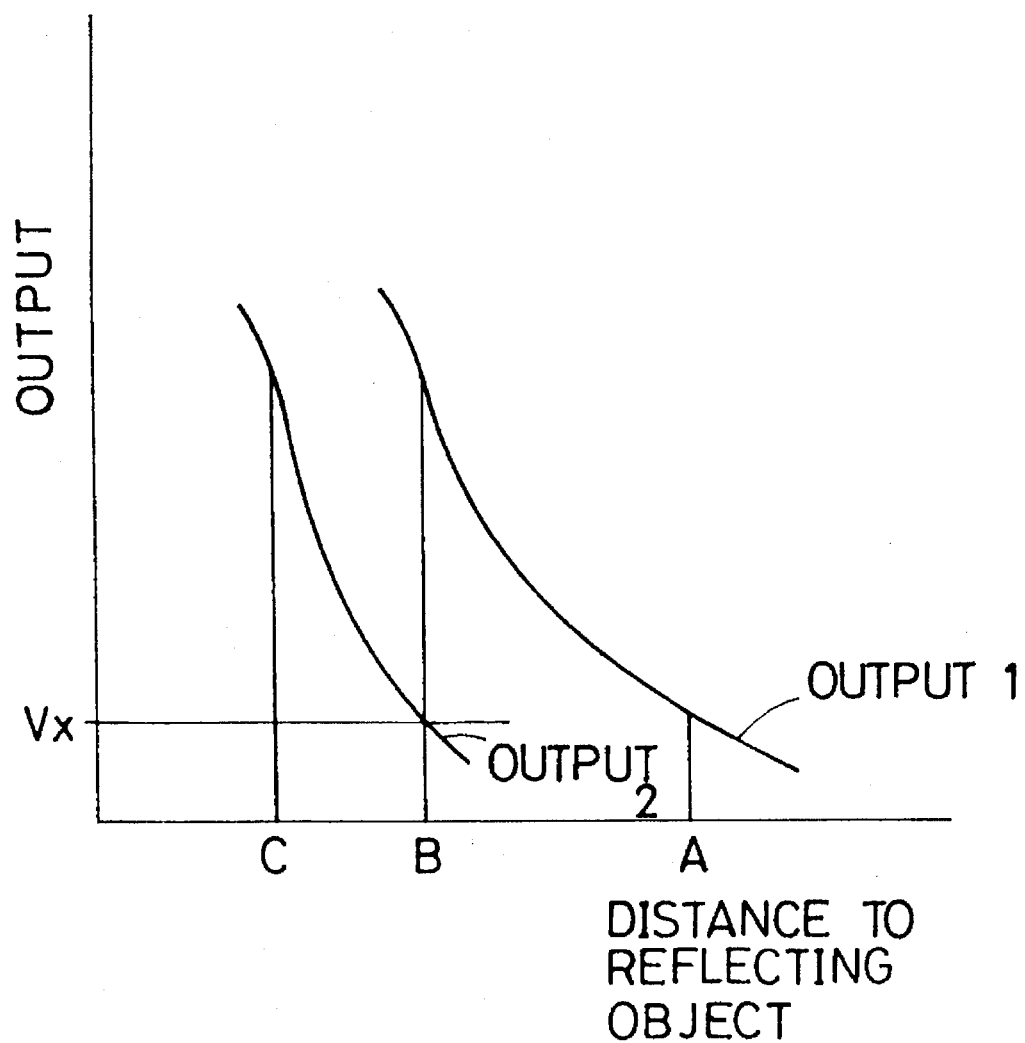
FIG. 8 is an output characteristic diagram of each light receiving element according to the third embodiment of the present invention.

FIG. 6 is a functional block diagram of the distance measuring sensor according to the third embodiment of the present invention, FIG. 7 is a diagram of detect operations of the distance measuring sensor of FIG. 6, and FIG. 8 is a diagram showing distance characteristics of the distance measuring sensor output of FIG. 6.

In FIGS. 6 and 7, components of light receiving portions PSDs 5a, 5b, signal processing circuits 8a, 8b for signal processing each PSD output, and lenses 4a, 4b are constituted by containing two sets of components having the same functions as those of the conventional PSD 5, the signal processing circuit 8 and lens 4. The LED 1 is also similar to the conventional one.

In this embodiment, detecting circuits 41a, 41b for detecting the amount of received light of each PSD 5a, 5b are respectively provided. The detecting circuits 41a, 41b, detect photoelectric currents flowing into the PSDs 5a, 5b, separately.

Each of signals from the detecting circuits 41a, 41b is applied to the control circuit 42 for controlling the amount of light emitted from the LED 1. A signal from the detecting circuit 41b is applied to a comparator 32 of a read control circuit 31.

In particular, the detecting circuit 41a is configured to be suitable for obtaining distance information of an object located at a longer distance compared to the detecting circuit 41b.

In the above-described control circuit 42, the produced current LED 1 is controlled not to exceed the acceptable photoelectric currents of the PSDs 5a, 5b based on signals from detecting circuits 41a, 41b by reducing the amount of emitted light of the LED 1. In other words, when respective light output currents of PSDs 5a, 5b increase, the amount of emitted light is controlled to be reduced, thereby controlling respective light output currents not to exceed respective acceptable photoelectric currents of the PSDs 5a, 5b.

The above-described read control circuit 31 includes the comparator 32 for comparing to determine whether or not the output result from the detecting circuit 41b is within a constant reference output range, and a switch 33 for automatically switching from an output of the signal processing circuit 8b to an output of the signal processing circuit 8a when said comparator 32 determines that the output result from the detecting circuit 41b is out of the constant reference output range.

The above-described comparator 32, as shown in FIG. 8, compares to determine whether or not the output signal from the detecting circuit 41b is larger than a constant reference output value Vx to transmit the result to the switch 33.

The above-described switch 33 is configured to switch an output from each of the signal processing circuits 8a, 8b in order to determine the distance to the object 3 to be detected based on the output signal of the signal processing circuit 8b when the output signal from the detecting circuit 41b is larger than the constant reference output value Vx and in order to determine the same based on the output signal of the signal processing circuit 8a when the output signal from the detecting circuit 41b is smaller than the constant reference output value Vx, according to the result from the comparator 32.

In the above-described configuration, after emission of the LED 1, the control circuit controls the amount of emitted light to be increased when determination is made of the long distance by a low amount of received light according to the amount of received light by at least one of the detecting circuits 41a, 41b. In this case, since the amount of light received from the object 3 to be detected is not so large, the produced current does not exceed the acceptable photoelectric current of the PSDs 5a, 5b.

When it is intended to measure a short distance, the control circuit controls the amount of emitted light to be decreased so that the produced current does not exceed the acceptable photoelectric current of the PSDs 5a, 5b.

As a result, since the control circuit controls the amount of light emitted from the light emitting portion in accordance with the distance to be measured, it is possible to measure not only a short distance but also a long distance.

As shown in FIG. 7, operations of detecting the object 3 to be detected in the range of the three points of A, B, and C will now be described in detail. In particular, the point B corresponds to a point where the output value of the detecting circuit 41b for the PSD 5b becomes the reference output value Vx.

If the object 3 to be detected is between the point A and the point B, light reflected by the object 3 is incident on the PSD 5b through one lens 4b as well as on the PSD 5a through the other lens 4a. A detect signal of the PSD 5b is transmitted to the signal processing circuit 8b, while the output of which is provided to the control circuit 31. On the other hand, a detect signal of the PSD 5a is transmitted to the signal processing circuit 8b, the output of which is provided to the control circuit 31.

However, in this case, as shown in FIG. 8, the output signal (output 2) from the detecting circuit 41b becomes smaller than the constant reference output value Vx. Therefore, the output signal of the signal processing circuit 8a is reread by the switch 33, to determine the distance to the object 3 to be detected based on the PSD 5a. More specifically, the distance range between B and A is the range which can be measured by the PSD 5a, and distance characteristics of the output become as shown by output 1 of FIG. 8.

If the object 3 to be detected is between the point B and the point C, light reflected by the object 3 is incident on the PSD 5b chip through the lens 4b. In this case, as shown in FIG. 8, as the output signal from the detecting circuit 41b becomes larger than the reference output value Vx, the switch 33 selects an output of the signal processing circuit 8b to determine the distance of the object 3 based on the output signal from the PSD 5b. More specifically, the distance range between C and B is the range which can be measured by the PSD 5b, and distance characteristics of the output become as shown by output 2 of FIG. 8.

As described above, by using characteristics of the outputs 1, 2, it is possible to obtain distance information of all of the objects 3 to be detected between the point C and the point A.

The present invention is not limited to the above-described embodiment, and it is apparent that various modifications and variations may be made to the above-described embodiment within the scope of the present invention.

For example, in the above-described embodiment, when the output value became smaller than the predetermined reference output value Vx serving as the output minimum value of one PSD 5b, switching to the other PSD 5a is carried out. However, it is also possible to carry out switching to the PSD 5b only when the output value becomes larger than a predetermined maximum value of the PSD 5a.

In the above-described embodiment, although the PSD 5a and the PSD 5b are sequentially arranged on one side of the LED 1, they may be arranged on both sides of the LED 1.

Figure 9:
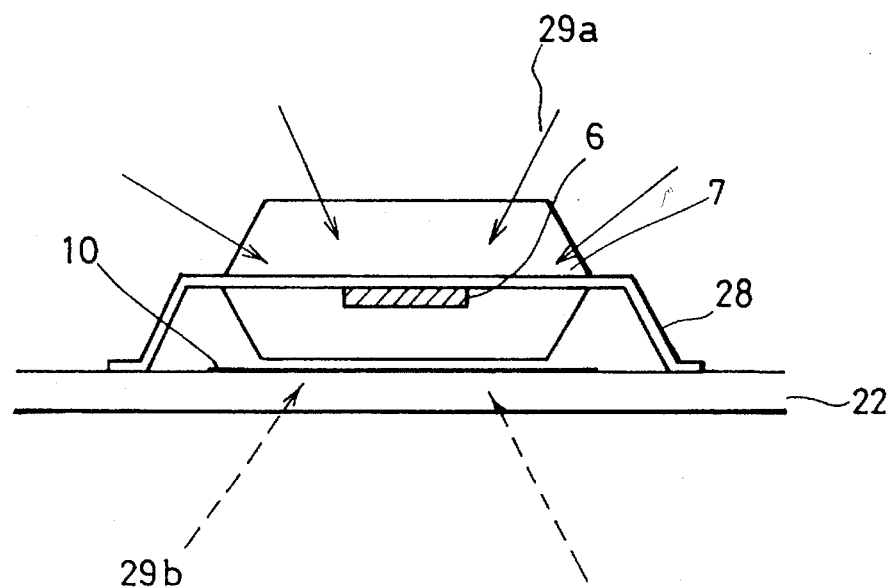
FIG. 9 is a diagram showing a cross-sectional structure of an IC according to a fourth embodiment of the present invention.

The fourth embodiment of the present invention will now be described with reference to FIGS. 9 and 10. FIG. 9 is a cross-sectional view of the IC of the distance measuring sensor according to this embodiment.

Referring to figures, the lead frame 28 of the IC 7 containing the IC chip 6 is mounted on the PWB 22 with the lead frame 28 being formed in the reverse direction toward the side where the IC chip 6 is mounted. As a result, the IC chip 6 is located between the lead frame 8 and the PWB 22. The lead frame 28 is grounded.

A GND pattern area 10 is provided in a portion on the PWB 22 corresponding to the IC 7 package mounting portion.

Figure 10:
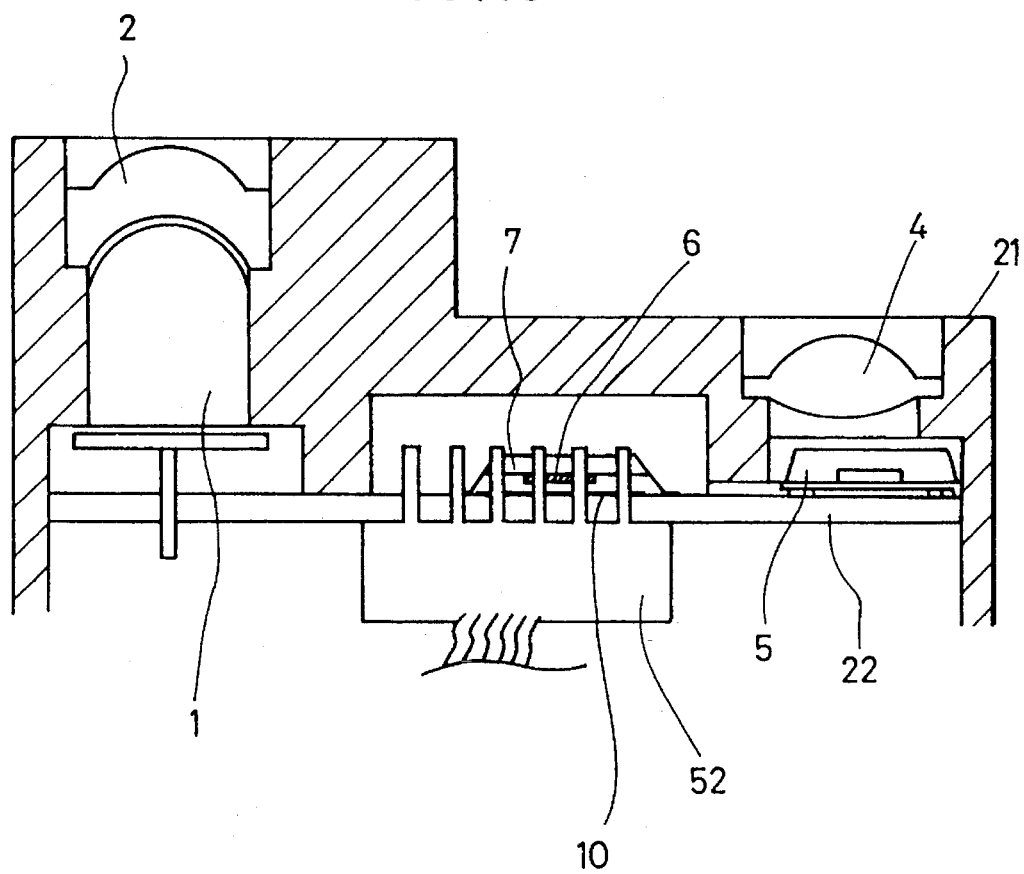
FIG. 10 is a cross-sectional view showing mounting of each component of the distance measuring sensor according to the fourth embodiment of the present invention.
Figure 12:
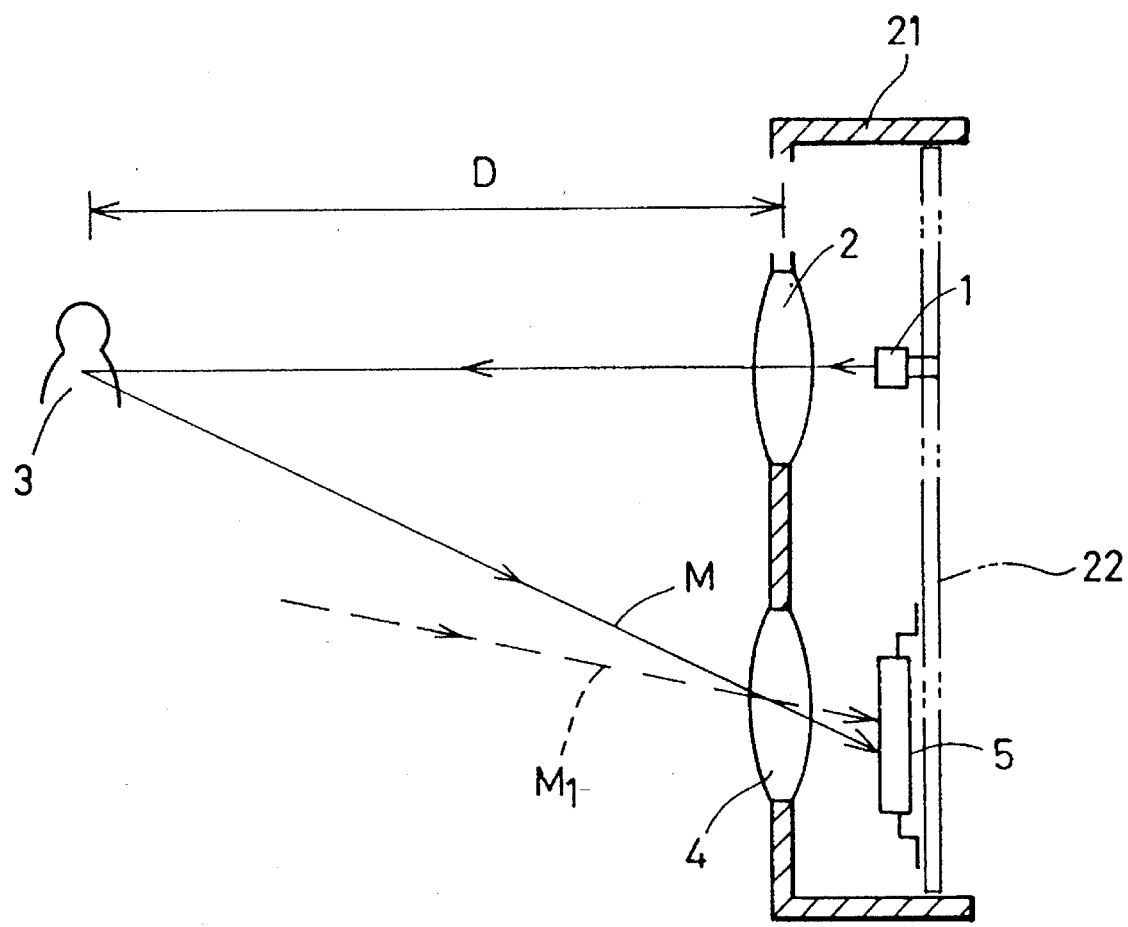
FIG. 12 is a diagram showing a cross-sectional structure of a conventional distance measuring sensor.
Figure 13:
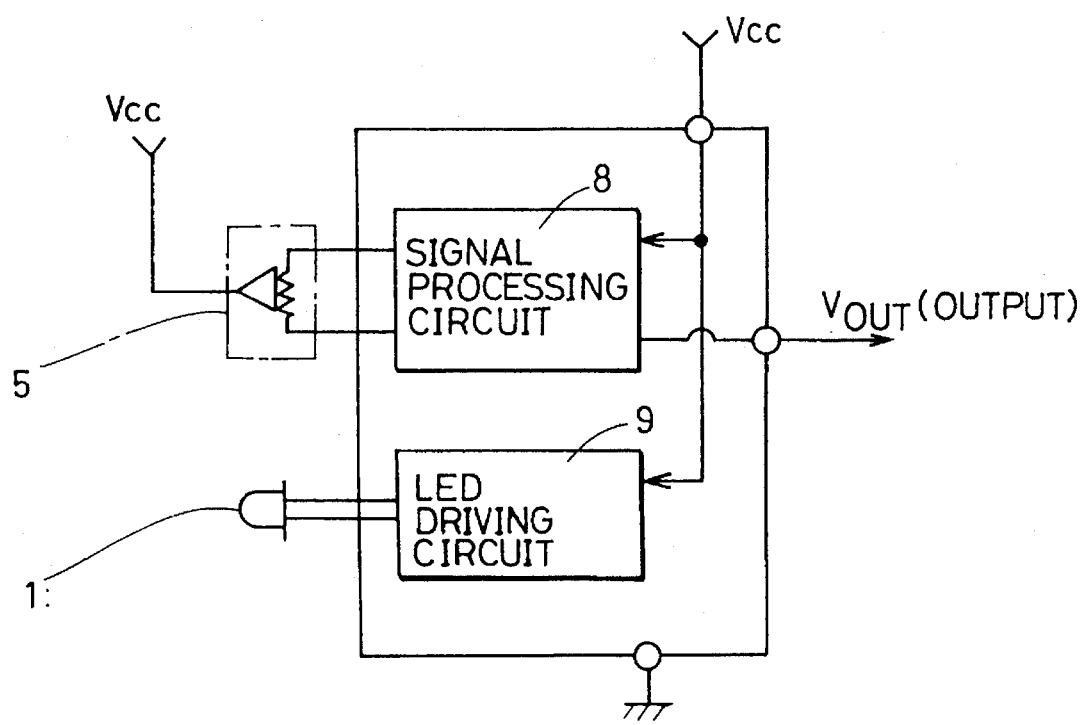
FIG. 13 is a system block diagram showing a configuration of the conventional distance measuring sensor.
Figure 14:
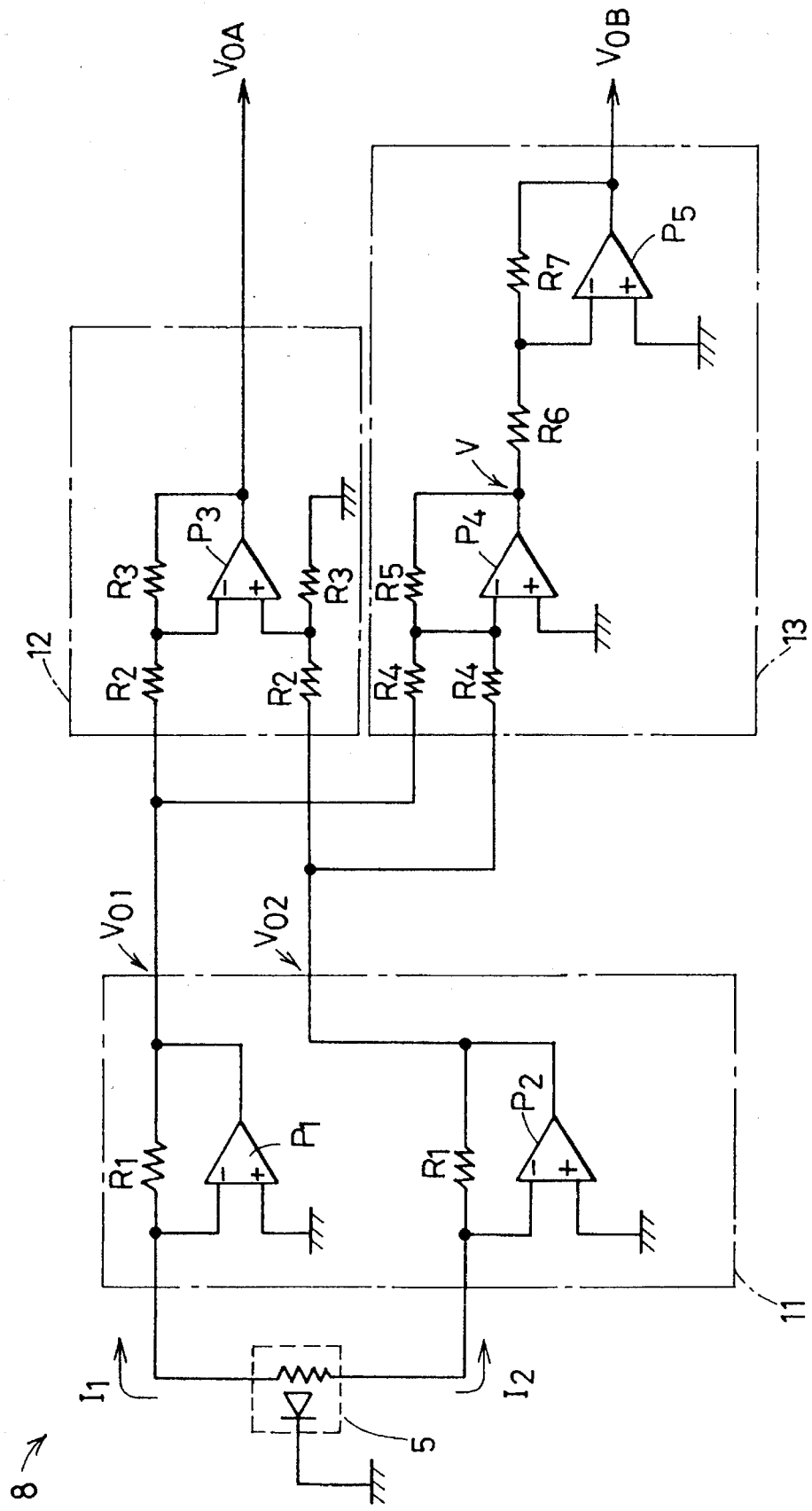
FIG. 14 is a schematic diagram of a circuit showing a specific configuration of a signal processing circuit shown in FIG. 13.
Figure 15:
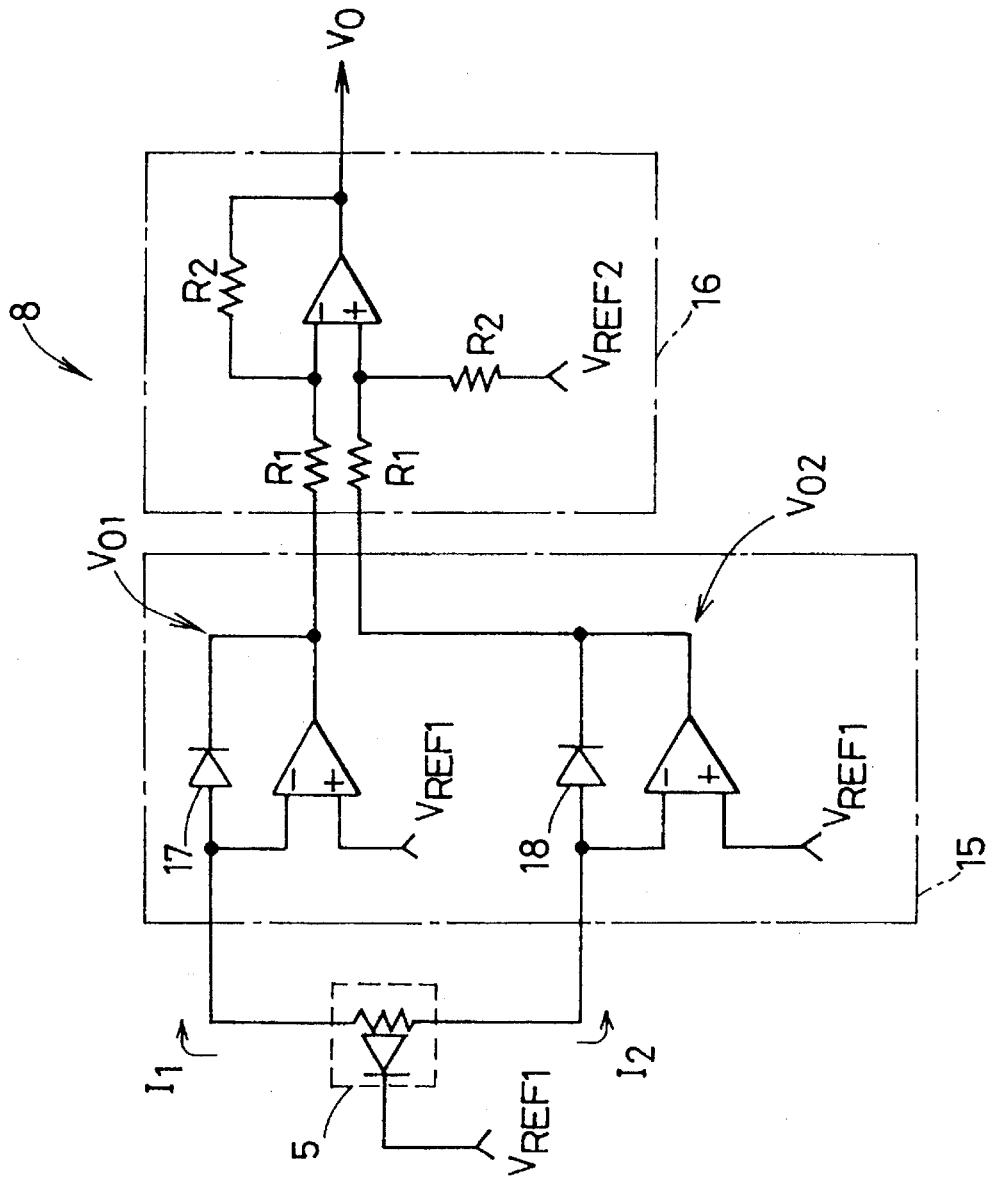
FIG. 15 is a diagram showing another example of the schematic diagram of a circuit showing the specific configuration of the signal processing circuit of FIG. 13.

FIG. 10 is a cross-sectional view of the distance measuring sensor using the IC 7 of FIG. 9. As shown in FIG. 10, the IC 7 formed reversely is mounted on the PWB 22. The LED 1 and the PSD 5 are accommodated in the case 21 and mounted on the PWB 22. Mutual electrical connection between the IC 7 and the LED 1, PSD 5 is made by a pattern (not shown) on the PWB 22.

In the figure, lenses 2, 4 are respectively arranged in the front face of the LED 1, and the PSD 5, and a connector 52 is used for connection to the outside.

By taking a configuration as described above, the noise 29a from the direction shown by a solid line arrow of FIG. 9 can be cut in the lead frame 28 grounded to GND, and the noise 29b from the direction shown by a dashed arrow can also be cut in the GND pattern area 10 on the PWB 22. Therefore, it is possible to enhance resistance to noise of the distance measuring sensor.

As a result, even if there is a noise source of, for example, an inverter fluorescent lamp and the like in the vicinity of the distance measuring sensor, it is possible to measure the distance accurately without being influenced by the noise.

The above-described structure can be easily achieved by adding the step of directing the forming of the lead frame 28 in the reverse direction with the conventional IC 7, and the step of providing the GND pattern area 10 on the PWB 22 by a step equivalent to the step of providing other interconnection patterns. Therefore, the above-described structure does not need substantial changes in the steps, making it possible to obtain high reliability of the distance measuring sensor by a simple change.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A distance measuring apparatus, comprising:

a light, emitting element;

a light receiving element;

a wiring board having a signal processing circuit formed thereon detecting a signal current from said light receiving element; and a housing case including a conductive material, accommodating at least said light receiving element, for directing light from said light emitting element to an object to be detected, receiving light reflected by the object at said light receiving element and measuring a distance to the object based on the signal current, wherein said housing case electrically shields at least said light receiving element from noise.

2. The distance measuring apparatus according to claim 1, wherein said conductive material constituting said housing case is grounded.

3. The distance measuring apparatus according to claim 2, wherein said conductive material includes polycarbonate resin.

4. The distance measuring apparatus according to claim 1, wherein said light receiving element includes a position sensitive photodetector (PSD).

5. The distance measuring apparatus according to claim 1, wherein said noise is generated by an inverter lamp.

6. A distance measuring apparatus, comprising:

a light emitting element providing light to an object to be detected;

a lens;

a light receiving element;

a signal processing circuit for detecting a signal current from said light receiving element, receiving light reflected by the object at said light receiving element through said lens, and measuring a distance to the object based on the signal current; and means for preventing a change in a relative position between said lens and said light receiving element caused by a change in temperature.

7. The distance measuring apparatus according to claim 6, further comprising:

a housing case, wherein said lens is mounted to a housing case, said light receiving element is mounted on a wiring board accommodated in said housing case, and a material of said housing case has a coefficient of linear expansion equivalent to that of a material of said wiring board.

8. The distance measuring apparatus according to claim 7, wherein said housing case is formed of a plastic material having a coefficient of linear expansion of 10–30 ppm/°C., and said wiring board is formed of a glass epoxy copper-clad laminate having a coefficient of linear expansion of 13 ppm/°C.

9. The distance measuring apparatus according to claim 6, wherein said light receiving element includes a position sensitive photodetector (PSD).

10. A distance measuring sensor comprising:

a light emitting element;

a light receiving element;

a wiring board provided with a signal processing circuit for detecting a signal current from said light receiving element accommodated in a conductive housing case, receiving the light reflected by the object at said light receiving element, and measuring a distance to the object based on the signal current, wherein said housing case is conductive, is grounded, and is formed of a material having a coefficient of linear expansion equivalent to that of said wiring board.

11. The distance measuring sensor according to claim 10, wherein a lens is mounted in said housing case, said reflected light is incident on said light receiving element through said lens, and said light receiving element is mounted on said wiring board.

12. The distance measuring sensor according to claim 11, wherein said conductive material includes polycarbonate resin.

13. The distance measuring sensor according to claim 11, wherein said housing case is formed of a plastic material having a coefficient of linear expansion of 10–30 ppm/°C., and said wiring board is constituted of a glass epoxy copper-clad laminate having a coefficient of linear expansion of 13 ppm/°C.

14. The distance measuring sensor according to claim 10, wherein said light receiving element includes a position sensitive photodetector (PSD).

15. A distance measuring apparatus, comprising:

a light emitting element, a light receiving element, an IC including a signal processing circuit for detecting a signal current from said light receiving element, a wiring board having said IC mounted thereon, an optical arrangement for directing light from said light emitting element to an object to be detected and receiving light reflected by the object at said light receiving element, wherein the signal processing circuit measures a distance to the object based on the signal current, and wherein said IC is shielded from noise impinging on two sides of the IC.

16. The distance measuring apparatus according to claim 15, wherein said IC includes an IC chip having said signal processing circuit and a grounded lead frame connecting said IC chip and said wiring board, and said IC chip is mounted to face said wiring board of said lead frame, such that said IC chip is shielded from noise on one side by said lead frame and on another side by said wiring board.

17. The distance measuring apparatus according to claim 16, wherein said light receiving element includes a position sensitive photodetector (PSD).

18. The distance measuring apparatus according to claim 16, wherein said lead frame is bent in a direction opposite to a bending direction of a conventional IC.

19. A distance measuring sensor having an LED, a position sensitive photodetector, and an IC including a driving circuit of said LED and a signal processing circuit of said position sensitive photodetector, wherein said IC is mounted on a board with a grounded lead frame such that said IC is mounted between the lead frame and the board.

20. The distance measuring sensor according to claim 19, wherein said light receiving element includes a position sensitive photodetector (PSD).

* * * * *